United States Patent
Marangoni et al.

(10) Patent No.: US 11,659,848 B2
(45) Date of Patent: May 30, 2023

(54) WAX OLEOGELS AS FAT SUBSTITUTES

(71) Applicant: Smart Base Ltd., Sudbury (CA)

(72) Inventors: Alejandro Marangoni, Guelph (CA); Nektarios Kranis, Sudbury (CA); Saeed Ghazani, Guelph (CA)

(73) Assignee: Smart Base Ltd., Sudbury (CA)

( * ) Notice: Subject to any disclaimer, the term of this patent is extended or adjusted under 35 U.S.C. 154(b) by 0 days.

(21) Appl. No.: 17/154,392

(22) Filed: Jan. 21, 2021

(65) Prior Publication Data
US 2021/0161166 A1 Jun. 3, 2021

Related U.S. Application Data

(63) Continuation of application No. PCT/CA2020/051215, filed on Sep. 10, 2020.

(60) Provisional application No. 62/898,732, filed on Sep. 11, 2019.

(51) Int. Cl.
*A23D 9/007* (2006.01)
*A23D 7/005* (2006.01)

(52) U.S. Cl.
CPC ........... *A23D 9/007* (2013.01); *A23D 7/0053* (2013.01)

(58) Field of Classification Search
CPC .............................. A23D 9/007; A23D 7/0053
See application file for complete search history.

(56) References Cited

U.S. PATENT DOCUMENTS

| | | | |
|---|---|---|---|
| 5,360,627 | A | 11/1994 | Desai et al. |
| 6,582,748 | B1 | 6/2003 | Loh et al. |
| 7,157,110 | B2 | 1/2007 | Loh et al. |
| 7,357,957 | B2 | 4/2008 | Marangoni et al. |

(Continued)

FOREIGN PATENT DOCUMENTS

| | | |
|---|---|---|
| CA | 2245467 | 3/2005 |
| CN | 108991137 | 12/2018 |

(Continued)

OTHER PUBLICATIONS

Tavernier et al., "Sequential Crystallization of High and Low Melting Waxes to Improve Oil Structuring in Wax-based Oleogels". RSC Adv., 2017, 7, 12113 (Year: 2017).*

(Continued)

*Primary Examiner* — Erik Kashnikow
*Assistant Examiner* — Assaf Zilbering
(74) *Attorney, Agent, or Firm* — Gowling WLG (Canada) LLP

(57) ABSTRACT

A novel oleogel is provided comprising an edible oil in an amount of at least 95 wt % combined with a binary wax blend in an amount of less than 5 wt % of the oleogel, wherein the oleogel exhibits less than 10% oiling off and a back-extrusion hardness of greater than 100 g-force. The edible oil may be a high oleic acid-containing oil, such as a vegetable oil having a total monounsaturated fatty acid content of at least about 25% by wt. The binary wax blend may comprise at least two waxes selected from rice bran wax, carnauba wax, candelilla wax, sunflower wax, jojoba oil wax, corn oil wax, sugarcane wax, ouricury wax, beeswax and retamo wax. The oleogel provides an edible fat substitute prepared from oil having a reduced saturated fatty acid and trans fatty acid content that may be incorporated in a variety of food products.

7 Claims, 11 Drawing Sheets

(56) References Cited

U.S. PATENT DOCUMENTS

| | | | |
|---|---|---|---|
| 7,718,210 | B2 | 5/2010 | Marangoni et al. |
| 8,227,011 | B2 | 7/2012 | Loh et al. |
| 10,653,162 | B2 | 5/2020 | Marangoni |
| 2007/0190186 | A1* | 8/2007 | Loh .................. A23L 7/183 424/725 |

FOREIGN PATENT DOCUMENTS

| | | |
|---|---|---|
| EP | 1178731 | 2/2002 |
| EP | 3387909 | 10/2018 |
| GB | 1146558 | 3/1969 |
| GB | 1163949 | 9/1969 |
| WO | 2000/69273 | 11/2000 |
| WO | 2014/043778 | 3/2014 |

OTHER PUBLICATIONS

"Typical Fatty-Acid Composition of Some Common Fats". Available online at http://web.pdx.edu/~wamserc/C336S12/fat.pdf Jul. 30, 2004. (Year: 2004).*

Vazquez et al., "Candelilla Wax as an Organogelator for Vegetable Oils—An Alternative to Develop Trans-free Products for the Food Industry". from "Edible Oleogels" Chapter 6. pp. 119-148, 2011. (Year: 2011).*

PCT Search Report dated Dec. 8, 2020 of PCT/CA2020/051215.

Written Opinion dated Dec. 8, 2020 of PCT/CA2020/051215.

Tavernier et al.—"Sequential Crystallization of High and Low Melting Waxes to Improve Oil Structuring in Wax-Based Oleogels", 2017 RSC-Advances Open-Access.

Winkler-Moser et al.—"Physical Properties of Beeswax, Sunflower Wax, and Candella Wax Mixtures and Oleogels", J Am Oil Chem Soc (2019) 96: 1125-1142.

Mandu et al.—"Waxes used as structuring agents for food organogels: A Review", Grasas Aceites 71 (1) Jan.-Mar. 2020, e344 ISSN-L: 0017-3495.

Marangoni et al.—"Encapsulating-structuring of edible oil attenuates acute elevation of blood lipids and insulin in humans". The Royal Society of Chemistry 2007, Soft Matter, 2007, 3, 183-187.

Jana, S., and Martini, S. (2016b) "Physical characterization of crystalline networks formed by binary blends of waxes in soybean oil", Food Research International, 89:245-253.

Hughes et al.—"Potential food applications of edible oil organogels", Trend in Food Science & Technology 20 (2009) 470-480.

Martins et al.—"Beeswax organogels: Influence of gelator concentration and oil type in the gelation process", Food Research International 84 (2016) 170-179.

Singh et al.—"Advances in edible oleogel technologies—A decade in review", Food Research International 97(2017) 307-317.

Mensink Ronald P. and Katan, Martijn B.—"Effect of Dietary Trans Fatty Acids on High-Density and Low-Density Lipoprotein Cholesterol Levels in Healthy Subjects", The New England Journal of Medicine 1990 vol. 323, No. 7 439-445.

Toro-Vazquez et al.—"Thermal and Textural Properties of Organogels Developed by Candelilla Wax in Safflower Oil", J Am Oil Chem Soc (2007) 84: 989-1000.

Limpimwong et al.—"Rice bran wax oleogel: A potential margarine replacement and its digestibility effect in rats fed a high-fat diet", Journal of Functional Foods 39 (2017) 250-256.

Ogutcu et al.—"Storage stability of cod liver oil organogels formed with beeswax and carnauba wax", International Journal of Food Science and Technology 2015, 50, 404-412.

Yilmaz and Ogutcu—"Oleogels as spreadable fat and butter alternatives—sensory description and consumer perceptioin", RSC Adv., 2015, 5 502 59.

Hwang et al.—"Preparation of Margarines from Organogels of Sunflower Wax and Vegetable Oils", Journal of Food Science, vol. 79, Nr. 10, 2014.

Hong-Sik Hwang et al.—"Margarine from Organogels of Plant Wax and Soybean Oil", J Am Oil Chem Soc (2013) 90: 1705-1712.

Da Silva et al.—"Sensory and Technological Evaluation of Margarines with Reduced Saturated Fatty Acid Contents Using Oleogel Technology", J Am Oil Chem Soc (2018) 95: 673-685.

Yilmaz and Ogutcu—"Comparative Analysis of Olive Oil Organogels Continuing Beeswax and Sunflower Wax with Breakfast Margarine", Journal of Food Science vol. 79, Nr. 9, 2014.

Zulim Botega et al.—"The Potential Application of Rice Bran Wax Oleogel to Replace Solid Fat and Enhance Unsaturated Fat Content in Ice Cream", Journal of Food Science, vol. 78, Nr.9, 2013.

Mert et al.—"Reducing saturated fat with oleogel / shortening blends in a baked product", Food Chemistry 199 (2016) 809-816.

Jang et al.—"Evaluation of canola oil oleogels with candelilla wax as an alternative to shortening in baked goods", Food Chemistry 187 (2015) 525-529.

Doan et al.—"Chemical profiling of the major components in natural waxes to elucidate their role in liquid oil structuring", Food Chemistry 214 (2017) 717-725.

Kyung Oh et al.—"Assessing the effectiveness of wax-based sunflower oil oleogels in cakes as a shortening replacer", LWT-Food and Technology 86 (2017) 430-437.

S. Jana and S. Martini—"Phase Behavior of Binary Blends of Four Different Waxes", J Am Oil Chem Soc (2016) 93: 543-554.

Gravelle et al.—"Influencing the crystallization behavior of binary mixtures of stearyl alcohol and stearic acid (SOSA) using ethylcellulose", Food Research International 91 (2017) 1-10.

Dassanayake et al.—"Physical Properties of Rice Bran Wax in Bulk and Organogels", J Am Oil Chem Soc (2009) 86: 1163-1173.

Chopin-Doroteo et al.—"The Effect of Shearing in the Thermomechanical Properties of Candelilla Wax and Candelilla Wax-Tripalmitin Organeogels", Food Biophysics (2011) 6: 359-376.

Blake et al.—"Structure and Physical Properties of Plant Wax Crystal Networks and their Relationship to Oil Binding Capacity", J Am Oil Chem Soc (2014) 91: 885-903.

Marangoni, Alejandro G.—"The nature of fractality in fat crystal networks", Trends in Food Science & Technology 13 (2002) 37-47.

Lessons from Harvey—Inform Mar. 2018 vol 29(3).

* cited by examiner

WAX OLEOGELS AS FAT SUBSTITUTES

FIELD OF THE INVENTION

The present invention generally relates to edible fat substitutes, and in particular, to wax organogels comprising natural wax combined with oil.

BACKGROUND OF THE INVENTION

Traditionally, hydrogenation (partial or full hydrogenation) alongside interesterification have been used to modify the molecular composition of fats and oils to obtain products with desirable physical and functional properties to manufacture margarines, shortenings and spreads. The use of these processes not only leads to increases in production costs, but also leads to the removal of healthy components from oils, such as natural antioxidants, phytosterols and polyphenols, which are present in small amounts. Moreover, chemical interesterification or hydrogenation may lead to the production of unhealthy compounds in the oil. Partial hydrogenation leads to the formation of trans fatty acids, while interesterification leads to the formation of partial glycerides which are precursors to carcinogenic components such as 3-monochloropropane-1,2-diol (3-MCPD) esters and glycidyl esters. Strong correlations between trans fatty acid consumption with some chronic diseases such as coronary heart disease and type 2 diabetes have been reported. Thus, oil-structuring alternatives to conventional fat modification processes are appealing for food manufacturing industries.

The use of food-grade gelators at low concentration (less than 5%) to structure and entrap edible oils into a fat-like structure is a novel strategy to create spreads and shortenings. For example, a fat-like structure (wax oleogel) may be obtained by heating a natural wax (e.g. sunflower wax, rice bran wax, candelilla wax, carnauba wax or beeswax) above its melting point in a liquid oil (such as soybean oil, corn oil, sunflower oil or olive oil), and allowing it to crystallize, form a crystal network and trap oil. The formed structure is thermo-reversible in that the wax oleogel can be re-structured after cooling by heating above its melting point.

Generally, natural wax gelators are esters of long chain aliphatic fatty alcohols, and may contain fatty acids, fatty alcohols, hydrocarbons and resins. For example, candelilla wax is comprised of about 50% n-alkanes with a chain length of 29-33 carbons, 20-29% long aliphatic chain esters, 12-14% alcohols and sterols, and 7-9% free fatty acids. Meanwhile, beeswax is mainly a complex blend of long aliphatic monohydric alcohols with chain lengths of 24 to 36, esterified to long aliphatic chain fatty acids with up to 36 carbon atoms, as well as hydroxylated acids and free fatty acids.

U.S. Pat. No. 6,582,748 B1 (2012) discloses a composition that includes a blend of a vegetable oil and an individual natural wax component from a plant species to formulate low saturated, low trans fatty acid food products. The amount of the plant-derived wax component is in the range of about 0.1% (w/w) to about 30% (w/w) of the total composition.

In the past few years, many attempts have been made to formulate margarine and shortenings using wax organogels. Soft or table margarines have a water-in-oil emulsion structure and usually contain oil, water, mono-acylglycerols, lecithin, coloring agent, vitamins, milk powder, citric acid and potassium sorbate. Traditionally, the oil phase in margarines is manufactured using either hydrogenation or interesterification to modify the oil composition of liquid oils (by increasing the amount of saturated fatty acids or changing the position of fatty acids in triacylglycerols, respectively) followed by the addition of emulsifiers and stabilisers. As a result, margarines (mainly hard margarines) usually contain high amounts of saturated fatty acids and/or trans fatty acids. To obtain a similar structure to that of a soft margarine, usually addition of wax to the oil provides a similar texture, spreadability and hardness. Wax-based spreads and margarines have a very low amount of saturated fatty acids and zero levels of trans isomers. In 2017, Limpimwong et al. (Journal of Functional Foods 39, 250-256) produced a margarine containing rice bran wax in rice bran oil, and studied lipid digestibility of the oleogel margarine compared to a commercial margarine. They showed oleogel margarine caused a decrease in adipose tissue accumulation, triacylglycerol content in blood serum and total cholesterol level in liver. They concluded RBW/RBO oleogel margarine may potentially be utilized as an alternative for making margarine and spreads with healthier properties and lower calories.

In other research in 2015, Ogutcu et al. (International Journal of Food Science and Technology, 50, 404-412) manufactured spreadable cod liver oil (CLO) wax oleogels using either beeswax or carnauba wax at different concentrations. These authors showed that after a 90-day storage, CLO margarine made with either BW or CW exhibited no significant changes in textural or oxidative properties. They concluded that gelation of CLO using BW or CW may be useful for masking the flavour of the cod liver oil, while increasing stability and providing new functionality (spreadability and hardness).

Yilmaz and Ogutcu (2015. RSC Adv., 5, 50259-50267) used beeswax and sunflower wax (5% w/w) to make butter substitute oleogel spreads using hazelnut oil and virgin olive oil. They showed that both oleogel spreads exhibited comparable structure and sensory characteristics to that of natural butter. Hwang et al. (2014. Journal of Food Science, 79, C1926-C1932) prepared margarine with 80:20 ratios of oil and water phases using sunflower wax (3-7% w/w) in different liquid oils. They reported that the firmness of wax spreads was dependent on the fatty acid composition of liquid oils. In 2013, Hwang et al. (Journal of the American Oil Chemists' Society, 90, 1705-1712) used 2-6% sunflower wax (SFW), rice bran wax (RBW) and candelilla wax (CDW) for gelation of soybean oil to make margarine with 80:20 ratios of oil to water phase. The authors reported phase separation in the emulsion formulated with CDW in the oil phase, while hardness varied significantly between the products comprising RBW and SFW. In recently published research, da Silva et al. (2018. Journal of the American Oil Chemists', 95, 673-685) studied the physical properties, oxidative stability and sensory characteristics of oleogel margarine containing 80% oil phase (70.6% high oleic sunflower oil, 4.9% interesterified fat, 2.7% candelilla wax and 1.8% mono-acyl glycerol) during six months of storage and found that it maintained good physical characteristics, and exhibited improved shelf life and nutritional properties. In similar research, a product comprising 3% sunflower wax or 7% beeswax in olive oil was determined to be quite similar in texture to a commercial breakfast margarine (Yilmaz et al. 2014. Journal of Food Science, 79, E1732-E1738).

It would be desirable to develop an oleogel product that exhibits improvements over existing products.

SUMMARY OF THE INVENTION

A novel oleogel product has now been developed with improved properties that render it useful as a fat substitute.

Thus, in one aspect of the invention, an oleogel is provided comprising an oil in an amount of 95 wt % or greater combined with a binary wax blend of less than 5 wt %, wherein the oleogel exhibits less than 10% oiling off and a back extrusion hardness of greater than 100 grams-force.

In another aspect of the invention, an oleogel is provided comprising a vegetable oil having a total monounsaturated fatty acid content of at least about 25% by wt in an amount of at least about 95 wt % combined with a binary wax blend of less than 5 wt %.

These and other aspects of the invention are described by reference to the following Figures.

DETAILED DESCRIPTION OF THE INVENTION

Figure 1:
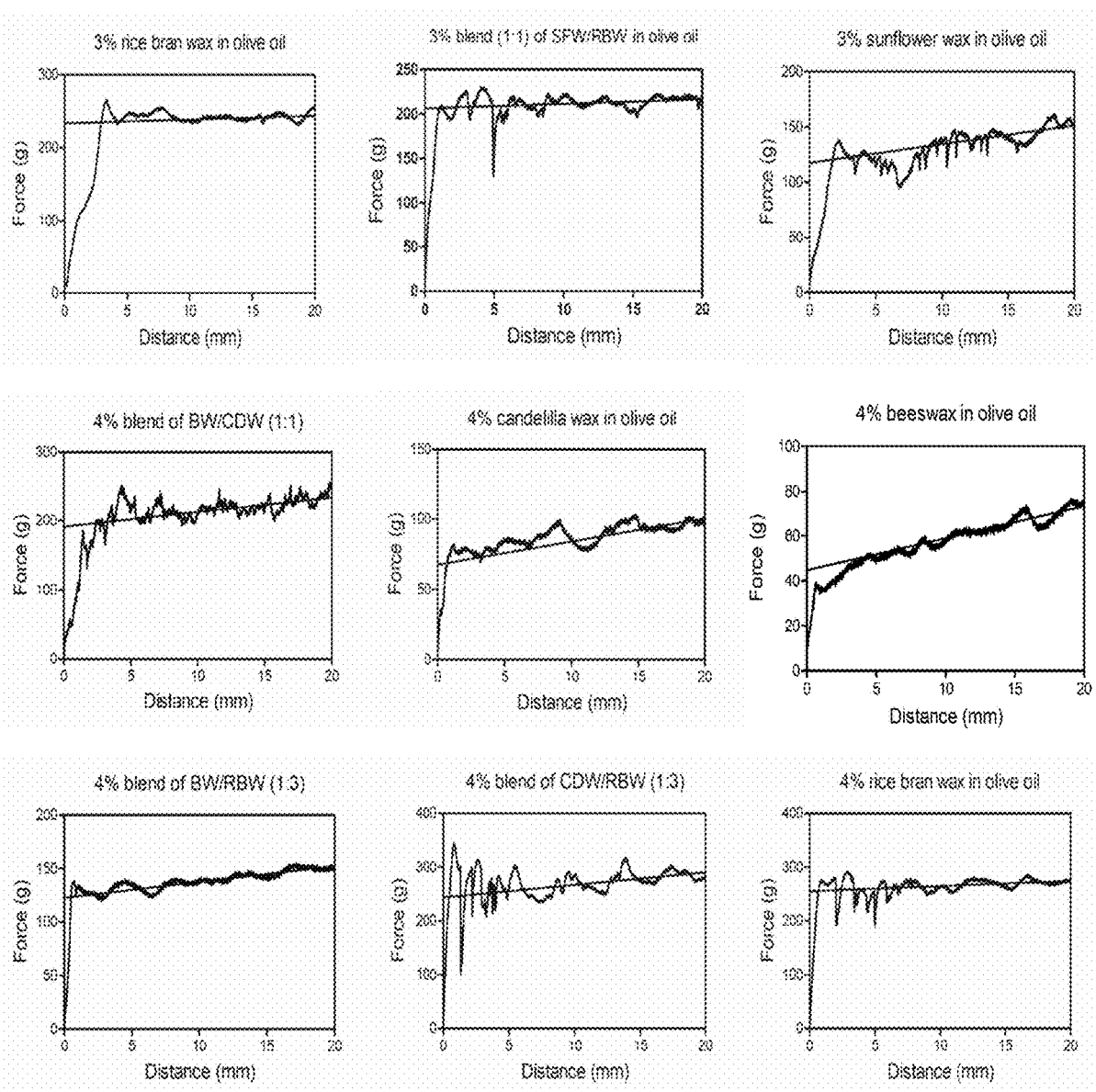
FIG. 1 illustrates back extrusion flow-curves (firmness) of 3% (w/w) and 4% (w/w) waxes (rice bran wax, sunflower wax, candelilla wax and beeswax) and various blends thereof in olive oil at 22° C.

An oleogel is provided comprising an oil in an amount of at least about 95 wt % combined with a binary wax blend of less than 5 wt %, wherein the oleogel exhibits less than 10% oiling off and a hardness of greater than 100 gram-force.

An oleogel is a product of which the majority is an oil fraction but it exhibits solid or solid-like behaviour, such as hardness, i.e. resistance to deformation.

The present oleogel comprises at least about 95 wt % oil. Preferably, the oil is a vegetable oil having a total mono-unsaturated fatty acid content of at least about 25% by wt, and more preferably, at least about 40% by wt, 50% by wt, 60% by wt, 70% by wt, 80% by wt or 90-95% by wt, e.g. in the range of about 50-95% by wt. In this regard, high oleic acid-containing oils such as olive oil, safflower oil, sunflower oil, canola oil, peanut oil, palm oil, corn oil and sesame oil, are examples of suitable oils. The term "high oleic acid-containing oil" is meant to encompass oils comprising at least about 50% by wt, and more preferably, at least about 60% by wt or at least about 70% by wt of oleic acid or greater. Preferred oils are non-hydrogenated. Examples of preferred oils include olive oil, safflower oil, sunflower oil and canola oil.

The oil component is combined with a wax blend of less than 5% by wt. The wax component of the oleogel includes a blend of at least two edible waxes (a binary blend) that function to provide structure to the oleogel, for example, to increase hardness, of the oleogel. Suitable waxes include, but are not limited to, rice bran wax, carnauba wax, candelilla wax, sunflower wax, jojoba oil wax, corn oil wax, sugarcane wax, ouricury wax, beeswax, retamo wax, and waxes which result from fully hydrogenated versions of oils, e.g. olive oil wax. The amount of each wax in the blend is not particularly restricted, providing that it does not adversely effect the rheological and functional properties of the oleogel. Thus, the wax blend may comprise a 1:1 ratio of the selected waxes, or a 1:2, 1:3 or other blend combinations. The wax blend is incorporated in the present oleogel in an amount of less than 5% by wt, e.g. 4%, 3.5%, 3%, 2.5% or 2% by wt. Preferably, at least one of the waxes of the blend is sunflower wax or rice bran wax. In one embodiment of the present invention, the binary wax blend is sunflower wax and rice bran wax.

The present oleogel may also include ingredients that optimize its use as a fat substitute in foods, such as but not limited to, fat-soluble additives including flavouring agents in an amount of 0.1% by wt or less, anti-oxidants such as tocopherol in an amount of 0.05% by wt or less, and preservatives, colouring agents, phytosterols, lutein, long chain omega-3 fatty acids and fat soluble vitamins, each in an amount of 0.1% by wt or less, preferably an amount of 0.05% by wt or less.

A characteristic of the present oleogel is its propensity to exhibit a high oil-binding capacity exemplified by little or no formation of free oil on application of force to the oleogel, e.g. oiling-off. Preferably, the present oleogel exhibits less than 10% oiling off, and more preferably, less than 5% oiling-off, less than 1% oiling-off or essentially no oiling-off. Oil-binding capacity or oiling-off may be determined using techniques well-established in the art, for example, as described in more detail herein.

The present oleogel also exhibits a hardness of at least about 100 gram-force as determined using methods such as an extrusion flow test, e.g. direct (forward) extrusion or back extrusion using a texture analyzer with a 30 kg load cell and a probe that penetrates into a testing vessel containing the oleogel to a depth of 20 mm at a speed of 1.5 mms$^{-1}$ at room temperature to cause extrusion (or thrusting against a resistance) of the oleogel between the vessel walls and the probe. Thus, the testing vessel and probe will generally each have a diameter that permits entry of the probe into the vessel but which results in extrusion of the oleogel between the probe and the vessel walls, e.g. the diameter of the testing vessel is within millimeters (e.g. less than 25 mm, such as 1-15 mm, 1-10 mm or 5-10 mm) of the diameter of the probe. The incorporation of a wax blend in the present oleogel unexpectantly provides a level of hardness in the oleogel that is not achieved by combining an oil with a single wax. Preferably, the present oleogel exhibits a hardness of at least 125, 150, 180, 200, 250 gram-force or greater.

The increased hardness of the present oleogel indicates that the mixed crystal formation resulting from the binary wax blend provides a product that leads to a continuous solid solution. Indeed, while not wishing to be bound by any particular theory, the crystals of the oleogel structure appear to be increased in size due to the wax blend, thereby increasing the gelation force within the oleogel.

The present oleogel will generally have a melting point that enhances its use as an edible fat substitute, to provide ease of use, for example, spreadability. Preferably, the oleogel has a melting point of less than 65° C., and more preferably, less than 60° C., 55° C., 50° C. or 45° C. Preferably, the oleogel melting point is in the range of 40-50° C.

Thus, the present oleogel advantageously provides an edible fat substitute prepared from oil having a reduced saturated fatty acid and trans fatty acid content as compared with similar products currently on the market, e.g. margarine and shortening products. The oleogel comprises a blend of natural waxes which together exhibit excellent gelation properties, compatibility for use in foods, are commercially available, and economically viable. The present oleogel may be incorporated in a variety of food products, including margarines and like spreads, baked goods such as cakes, cookies, tarts and breads, marinades when combined with herbs and spices (providing a dense product that is a good carrier of marinade contents and provides an even coating on meats), concentrated broths, stocks, bouillons (in the form of pastes or dehydrated cubes) and ice cream.

Embodiments of the invention are described by reference to the following specific examples which are not to be construed as limiting.

Example 1

Preparation of Compositions—Four natural waxes (sunflower wax (SFW), rice bran wax (RBW), candelilla wax (CDW) and beeswax (BW)) were obtained as gift from Koster Keunen Inc. (Watertown, Conn., USA) to make various wax blends of 2 to 4 wt % in olive oil (Gallo, UNICI Inc., Concord, Canada). Samples (mixture of waxes in olive oil) were prepared by heating mixtures in an incubator at 100° C. for 1 hour to dissolve the waxes and eliminate any effects of crystal memory. Samples were then mixed by hand with a glass stir rod, divided into glass tubes and were allowed to gel at room temperature overnight. All samples were prepared at least in triplicates, and stored for a minimum of 48 hours prior to analysis.

Physical and functional properties of wax oleogels were compared with a commercial soft margarine (Imperial, Unilever Canada, Toronto). Small samples (about 15 g) were prepared for X-ray and differential scanning calorimetry (DSC) analysis and microscopy tests. A larger batch (about 100 g) of wax ologels were prepared for back extrusion tests.

Characterization of Gel Structures

Differential scanning calorimetry (DSC)—Melting points of the samples were obtained using a DSC model Q2000 (TA Instruments, Mississauga, ON, Canada). Nitrogen was used as the purge gas at a flow rate of 18 mL/min. Melting points (endothermic peak) of samples (10-15 mg) were determined by heating samples from 20 to 100° C. at a heating rate of 5° C./min.

X-ray analysis—The crystal structure and polymorphic form of individual waxes and also wax mixtures in olive oil were analyzed by X-ray diffraction (Multiflex Powder XRD spectrometer, Rigaku, Tokyo, Japan). The copper X-ray tube (wavelength of 1.54 Å) was operated at 40 kV and 44 mA. The measurement scan rate was set at 0.1°/min in the range $2\theta=1-30°$ at 20° C. Peak positions were determined using MDI Jade 9 (MDI, Livermore, Calif., USA) software.

Large deformation/plasticity—The large deformation properties of the wax oleogels was assessed using back extrusion analysis. Wax oleogels were prepared as described above, and once all components were dispersed in the oil, the mixture was split into 15 ml glass tubes (having a diameter of 15 mm) and stored two days prior to analysis. The back extrusion test was performed using a TA.XT2 texture analyzer (Stable Micro Systems Ltd., Texture Technologies Corp., Scarsdale, N.Y., USA) equipped with a 30 kg load cell and a cylindrical stainless steel probe (height=89 mm; diameter=9.20 mm) with a truncated semi-spherical tip (height=6.75 mm; diameter=10.20 mm). Samples were tested at room temperature (22-23° C.) and penetrated to a depth of 20 mm at a speed of 1.5 $mms^{-1}$. The relative plasticity of the gels was evaluated based on the profile of the flow curve once steady-state flow was achieved (10-20 mm penetration) by calculating the root mean square deviation from a linear regression of the steady state region. The flow behavior of the wax oleogels was also compared to that of a commercial soft margarine. The commercial soft margarine was warmed to room temperature and put into 15 ml glass tubes for testing at room temperature. The 'brittleness' of the flow behavior was also analyzed by fitting the steady-state flow region (10-20 mm) to a linear regression of the steady state region. The elastic constant that shows gel strength was calculated by dividing maximum force peak of back extrusion flow curves to distance (mm).

Optical microscopy—The microstructure of the wax oleogels was determined using an optical microscope model BX60 (Olympus Optical Co., Tokyo, Japan) equipped with a 20× objective lens. Images were captured (20×) with a model DP71 digital camera (Olympus Optical Co., Tokyo, Japan) using the v1.0 cell Sens software. A 5-µL sample of each molten wax organogel in olive oil was placed on a preheated (80° C.) glass microscope slide and covered with a preheated (80° C.) glass coverslip. Slides were heated at 80° C. for 15 min to erase the crystal memory, then cooled to 22° C. and held for ten days prior to observations.

Oiling-off test—To calculate the amount of released oil from the oleogel structure, first the weights of empty Eppendorf tubes were determined (a) and then about 1 mL of completely melted wax oleogel was placed into weighted Eppendorf tubes and the tubes were left for 2 days at room temperature to complete the crystallization. After obtaining the weight of samples and tubes (b), the tubes were centrifuged at 14000/min for 30 minutes at room temperature. Then, the tubes were turned over and left over-night on filter paper to drain any separated oil. The tubes were weighed (c) the next morning. The oiling-off (%) was calculated using following equation:

Oiling-off (%)=[(b−a)−(c−a)]/(b−a)×100

Statistical analysis—Statistical analysis was carried out using GraphPad Prism software version 5.0 (La Jolla, Calif., USA). All analyses were run at least in triplicate and results were stated as mean values±standard deviations. Data were evaluated using one-way ANOVA (Tukey's test—t-test) and a probability of p<0.05 was considered to be significant.

Results and Discussion

Oil-Binding Capacity (Oiling-off test)—Formation of free oil (exuded oil) on the top of a gel as a result of applying force (by shear or centrifuge) is referred to as 'oiling-off'. Applying shear and extensive coalescence resulted in breaking the gel network and releasing oil to the system. Wax oleogels showed a high oil binding capacity. For example, addition of 2% rice bran wax or sunflower wax into liquid oil is enough to structure a three-dimensional network and forming structure. Oil-binding capacity of wax oleogels is one of the main characteristics to define their functionality in food products. To introduce wax oleogels as an alternative for fats in margarines and spreads, they should provide strong structure and be able to tolerate processing conditions involving mixing and applying shear. Many factors effect oil binding capacity in wax oleogels including crystalline history, crystal structure and size, shear or mixing, and rate of cooling.

In this study, it was found that some organogels containing varying proportions of binary mixtures of candelilla wax/beeswax or rice bran wax/sunflower wax, exhibited zero oiling-off. Moreover, similar results were obtained for binary mixtures of beeswax/rice bran wax (1:3) and candelilla wax/rice bran wax (1:3). The oiling-off measurement results (mean±SD) for 3% (w/w) of neat and binary mixtures of sunflower wax, rice bran wax, candelilla wax and beeswax in olive oil are shown in Table 1.

No oiling-off was observed for oleogels containing binary mixtures of sunflower wax/rice bran wax and beeswax/candelilla wax. It is important to mention that oiling-off content for neat 3% candelilla wax and beeswax was 23.5% and 28.2%, respectively, which was reduced in many of the binary mixtures, perhaps due to the wax crystal structure formed and/or synergistic effect in binary wax mixtures in olive oil.

TABLE 1

| Oil Loss (%) | | SFW $0^a$ | RBW $0^a$ | CDW $23.50 \pm 2.12^b$ | BW $28.17 \pm 2.47^c$ |
|---|---|---|---|---|---|
| SFW/RBW (1:1) $0^a$ | SFW/CDW (1:1) $58.49 \pm 0.70^b$ | SFW/BW (1:1) $5.30 \pm 0.07^c$ | RBW/CDW (1:1) $17.04 \pm 1.42^d$ | RBW/BW (1:1) $10.99 \pm 0.33^e$ | CDW/BW (1:1) $0^a$ |
| SFW/RBW (1:3) $0^a$ | SFW/CDW (1:3) $10.34 \pm 0.79^b$ | SFW/BW (1:3) $15.09 \pm 0.52^c$ | RBW/CDW (1:3) $25.37 \pm 0.71^d$ | RBW/BW (1:3) $0.94 \pm 0.45^a$ | CDW/BW (1:3) $0^a$ |
| SFW/RBW (3:1) $0^a$ | SFW/CDW (3:1) $28.26 \pm 0.34^b$ | SFW/BW (3:1) $1.02 \pm 0.54^c$ | RBW/CDW (3:1) $0^a$ | RBW/BW (3:1) $0^a$ | CDW/BW (3:1) $0^a$ |

*Different superscript letters in the same row represent statistically differences between the oiling off amount between 3% individual waxes or binary mixtures ($P < 0.05$).

Large deformation/plasticity—The large deformation properties and relative plasticity of neat waxes and binary wax blends in olive oil were evaluated using back extrusion flow curves. In this analysis, wax oleogel penetration was studied using a probe to force the gel structure to flow in the direction of the probe. FIG. 1 shows the back extrusion flow-curves (firmness) for selected individual and binary blends in olive oil at room temperature. The back extrusion technique can be used to quantify and show brittleness and plastic flow behavior of materials. In this technique, the downward movement of the probe and its penetration into the gel structure causes gel deformation in the opposite direction of the rod. Studying the intensity and fluctuation of noise in obtained graphs clearly shows the hardness and plasticity of different wax oleogels. By determining the root mean square error of the noise in the steady state region of a linear regression of a force-deformation curve, one can derive a measure of brittleness or plasticity. The greater the root mean square error, or standard deviation/error, the greater the brittleness and the lower the plasticity. Root mean square error was determined and is shown in Table 2.

TABLE 2

Root mean square error (mean ± sd) in the force-deformation profiles for individual and binary wax mixtures in olive oil (2-4% w/w)

| Binary blends ratios | Percentage of wax in olive oil | | | | |
|---|---|---|---|---|---|
| | 2.0% | 2.5% | 3.0% | 3.5% | 4.0% |
| SFW/RBW 100/0 | $2.86 \pm 1.16^a$ | $4.29 \pm 1.51^a$ | $6.17 \pm 2.73^a$ | $5.34 \pm 1.62^a$ | $7.28 \pm 2.55^a$ |
| SFW/RBW 75/25 | $3.03 \pm 0.88^a$ | $4.65 \pm 1.34^a$ | $9.96 \pm 1.84^{a,b}$ | $11.47 \pm 2.97^b$ | $11.46 \pm 5.02^a$ |
| SFW/RBW 50/50 | $2.60 \pm 0.74^a$ | $4.27 \pm 0.11^a$ | $5.15 \pm 1.65^a$ | $5.52 \pm 1.12^a$ | $13.60 \pm 5.16^a$ |
| SFW/RBW 25/75 | $3.58 \pm 0.85^a$ | $3.39 \pm 0.30^a$ | $3.91 \pm 0.24^a$ | $7.45 \pm 1.92^a$ | $8.81 \pm 1.38^a$ |
| SFW/RBW 0/100 | $1.92 \pm 1.04^a$ | $2.81 \pm 0.70^a$ | $5.69 \pm 3.02^{a,b}$ | $4.54 \pm 1.42^a$ | $7.36 \pm 3.43^a$ |
| CDW/BW 100/0 | $1.43 \pm 0.21^a$ | $1.61 \pm 0.40^a$ | $2.17 \pm 0.48a^a$ | $2.98 \pm 1.08^a$ | $3.2 \pm 2.06^a$ |
| CDW/BW 75/25 | $2.53 \pm 3.43^a$ | $2.01 \pm 1.55^a$ | $4.02 \pm 4.21^a$ | $5.18 \pm 2.19^a$ | $7.98 \pm 2.82^{a,b}$ |
| CDW/BW 50/50 | $8.26 \pm 1.16^b$ | $18.54 \pm 7.53^b$ | $15.87 \pm 7.12^b$ | $17.77 \pm 3.86^b$ | $20.26 \pm 11.56^b$ |
| CDW/BW 25/75 | $2.01 \pm 1.51^a$ | $2.93 \pm 2.80^a$ | $4.05 \pm 2.73^a$ | $5.74 \pm 3.00^a$ | $11.52 \pm 4.25^{a,b}$ |
| CDW/BW 0/100 | $0.76 \pm 0.00^a$ | $1.02 \pm 0.14^a$ | $0.92 \pm 0.23^a$ | $2.17 \pm 1.17^a$ | $2.79 \pm 1.39^a$ |
| CDW/RBW 25/75 | $2.34 \pm 0.46^a$ | $3.86 \pm 0.90^a$ | $5.75 \pm 1.31^a$ | $10.26 \pm 3.16^a$ | $11.79 \pm 4.76^a$ |
| BW/RBW 25/75 | $2.76 \pm 1.16^a$ | $4.05 \pm 1.06^a$ | $4.58 \pm 0.29^a$ | $10.57 \pm 4.62^a$ | $4.00 \pm 1.40^b$ |

*Different superscript letters in the same column represent statistically differences between the brittleness amount for binary wax mixtures in same concentration ($P < 0.05$).

Figure 2:
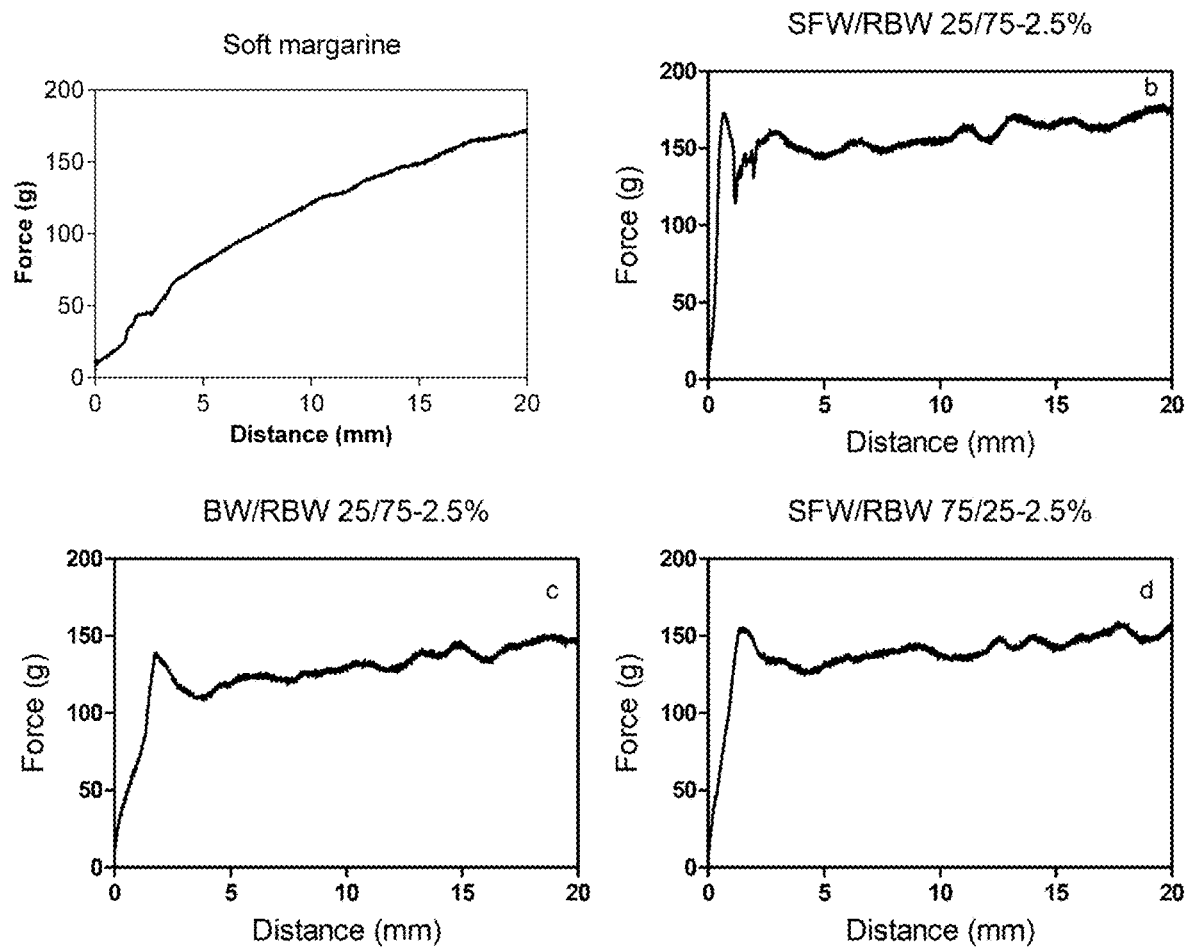
FIG. 2 compares the back extrusion flow-curve (firmness) of commercial soft margarine (a) with 2.5% (w/w) selected binary wax mixtures in olive oil (b-d)

Based on the results, strain sweeps for all binary mixtures at lower wax concentrations displayed less fluctuation (noise) in the steady-state flow stage (from 10 mm to 20 mm). At increasing concentrations, a flow pattern trend from more plastic to more brittle was observed (Table 2). However, the highest noise levels (least plasticity) and the lowest fluctuation (high plasticity) were observed for CDW:BW 1:1 (w/w) and CDW:BW 3:1 (w/w) blends, respectively. A brittle gel network (low plasticity) is not a proper structure for mimicking margarine texture because under large deformation, it does not possess the required plasticity. The brittleness of soft margarine used in this study was 3.4, which is similar to that of 2.5% and 3% of binary mixtures of sunflower wax/rice bran wax (1:1, 3:1 and 1:3) and candelilla wax/beeswax (1:3). Interestingly, the 4% binary mixture of BW/RBW 25/75 in olive oil showed a brittleness factor of 4, while all other wax blends in olive oil exhibited much higher brittleness (i.e. greater than 7). This indicates that addition of 2 to 3% binary mixtures of waxes (as crystalline material) to olive oil is sufficient to provide a three dimensional crystal structure with a proper rheological behavior (improved plasticity by reducing brittleness) to mimick soft margarine. FIG. 2 shows similarity between the back extrusion flow-curve (firmness) of commercial soft margarine (a) with 2.5% (w/w) selected binary wax mixtures in olive oil (b-d).

The hardness of a wax oleogel is one of the main parameters in determining the potential functionality of the oleogel in a food product (margarine, shortening and spread). The back extrusion flow test results (the wax gel firmness) for 2-4% (w/w) individual and binary mixture of sunflower wax, rice bran wax, candelilla wax and beeswax in olive oil are shown in Table 3.

of oleogels with SFW/RBW combinations was also higher when compared to the hardness of neat SFW and RBW. It is also notable that a wax gel prepared with only 2.5% beeswax and candelilla wax was weak; however, the interaction between these two waxes in a binary 1:1 mixture at a 2.5% concentration exhibited an increased (synergistic) gel strength and firmness similar to that observed for a commercial soft margarine (134.88±17.29 gram-force). The flow behavior of commercial margarine, either soft margarine at 8° C. (from the fridge) or baking margarine at room temperature, showed a smooth profile without any brittleness due to its plastic nature (FIG. 2). Similarly, the elasticity of oleogels comprising binary wax mixtures was also greater than the elasticity of corresponding oleogels with neat wax content.

TABLE 3

Back extrusion flow test results (wax gel firmness) (grams-force)

| Binary blends | Percentage of wax in olive oil | | | | |
|---|---|---|---|---|---|
| | 2.0% | 2.5% | 3.0% | 3.5% | 4.0% |
| SFW/RBW 100/0 | 51.91 ± 16.52$^a$ | 75.49 ± 29.21$^a$ | 115.08 ± 34.13$^a$ | 157.62 ± 24.08$^a$ | 198.39 ± 10.91$^a$ |
| SFW-RBW 75-25 | 135.59 ± 15.10$^b$ | 158.61 ± 16.49$^{b,c}$ | 211.82 ± 25.52$^b$ | 237.43 ± 34.13$^b$ | 270.14 ± 30.15$^b$ |
| SFW-RBW 50-50 | 122.74 ± 11.58$^b$ | 179.28 ± 5.73$^{b,c}$ | 204.61 ± 11.51$^b$ | 270.84 ± 16.97$^b$ | 296.87 ± 40.60$^b$ |
| SFW-RBW 25-75 | 128.54 ± 12.34$^b$ | 189.35 ± 11.95$^b$ | 244.93 ± 20.54$^b$ | 265.91 ± 25.34$^b$ | 321.26 ± 27.33$^b$ |
| SFW/RBW 0/100 | 108.71 ± 16.49$^b$ | 148.83 ± 19.56$^c$ | 204.72 ± 17.15$^b$ | 227.14 ± 27.28$^b$ | 288.32 ± 16.67$^b$ |
| CDW/BW 100/0 | 24.51 ± 1.04$^a$ | 34.27 ± 3.39$^a$ | 49.15 ± 3.77$^a$ | 64.28 ± 3.44$^a$ | 114.01 ± 21.15$^{a,c}$ |
| CDW/BW 75/25 | 30.53 ± 16.58$^a$ | 42.15 ± 16.82$^a$ | 58.96 ± 16.18$^a$ | 85.77 ± 11.74$^a$ | 117.81 ± 14.42$^a$ |
| CDW/BW 50/50 | 74.00 ± 10.96$^b$ | 131.52 ± 33.07$^b$ | 179.58 ± 32.98$^b$ | 194.20 ± 47.48$^b$ | 222.20 ± 40.00$^b$ |
| CDW/BW 25/75 | 31.14 ± 14.96$^a$ | 40.28 ± 22.17$^a$ | 61.90 ± 32.68$^a$ | 77.67 ± 34.37$^a$ | 144.29 ± 22.06$^c$ |
| CDW/BW 0/100 | 11.24 ± 2.61$^a$ | 20.11 ± 6.61$^a$ | 25.78 ± 12.23$^a$ | 47.76 ± 12.80$^a$ | 59.54 ± 21.81$^c$ |
| CDW/RBW 25-75 | 95.17 ± 14.45$^a$ | 124.04 ± 9.26$^a$ | 156.23 ± 10.38$^a$ | 178.09 ± 19.88$^a$ | 269.71 ± 20.40$^a$ |
| BW/RBW 25-75 | 30.53 ± 16.58$^b$ | 42.15 ± 16.82$^b$ | 58.96 ± 16.18$^b$ | 85.77 ± 11.74$^b$ | 117.81 ± 14.42$^b$ |

*Different superscript letters in the same column represent statistically differences between the firmness of binary wax mixtures at the same concentration ($P < 0.05$).

Figure 3:
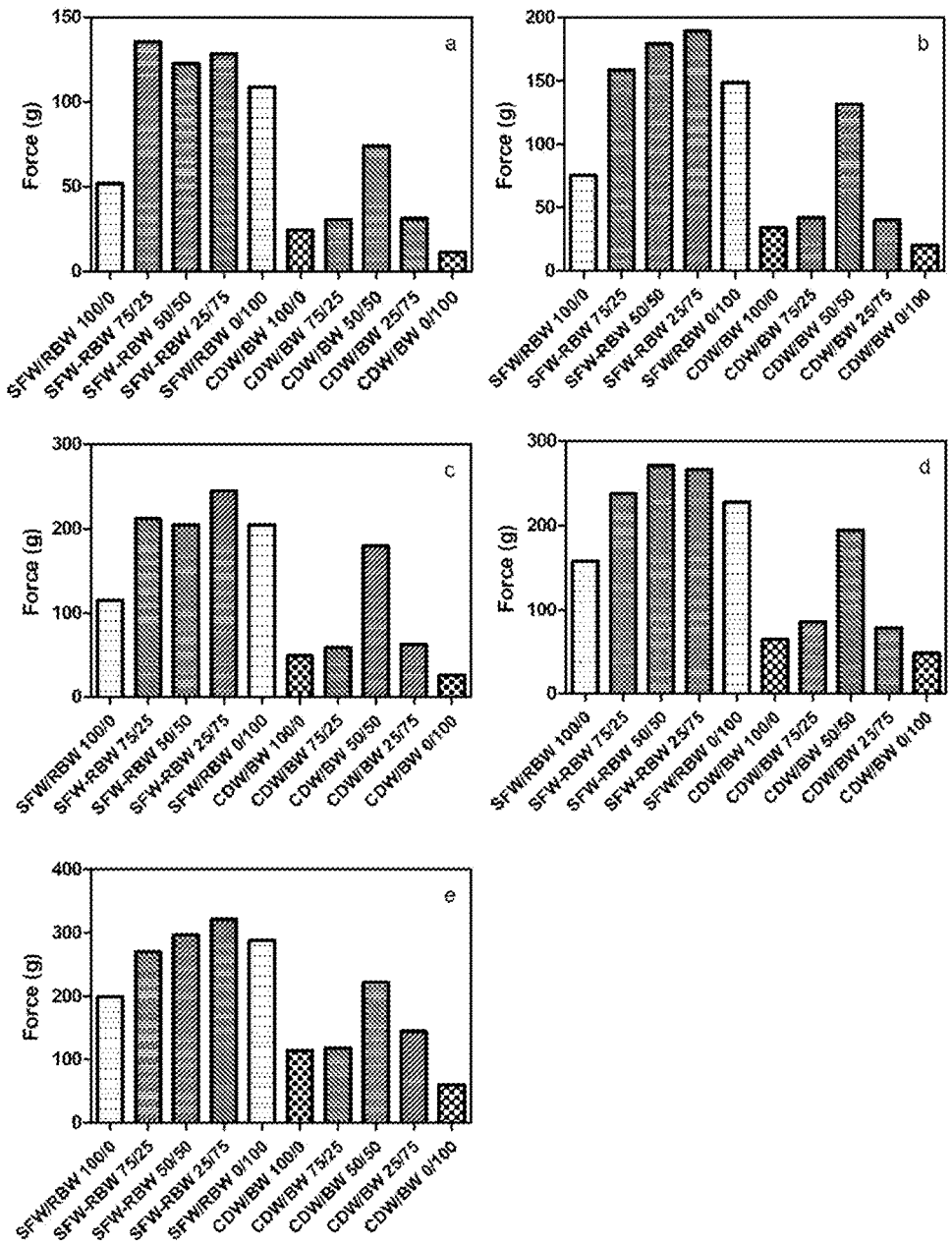
FIG. 3 compares the firmness of 2% (a), 2.5% (b), 3% (c), 3.5% (d) and 4% (e) of individual and binary mixtures of sunflower wax (SFW), rice bran wax (RBW), Beeswax (BW) and candelilla wax (CDW) in olive oil.
Figure 4:
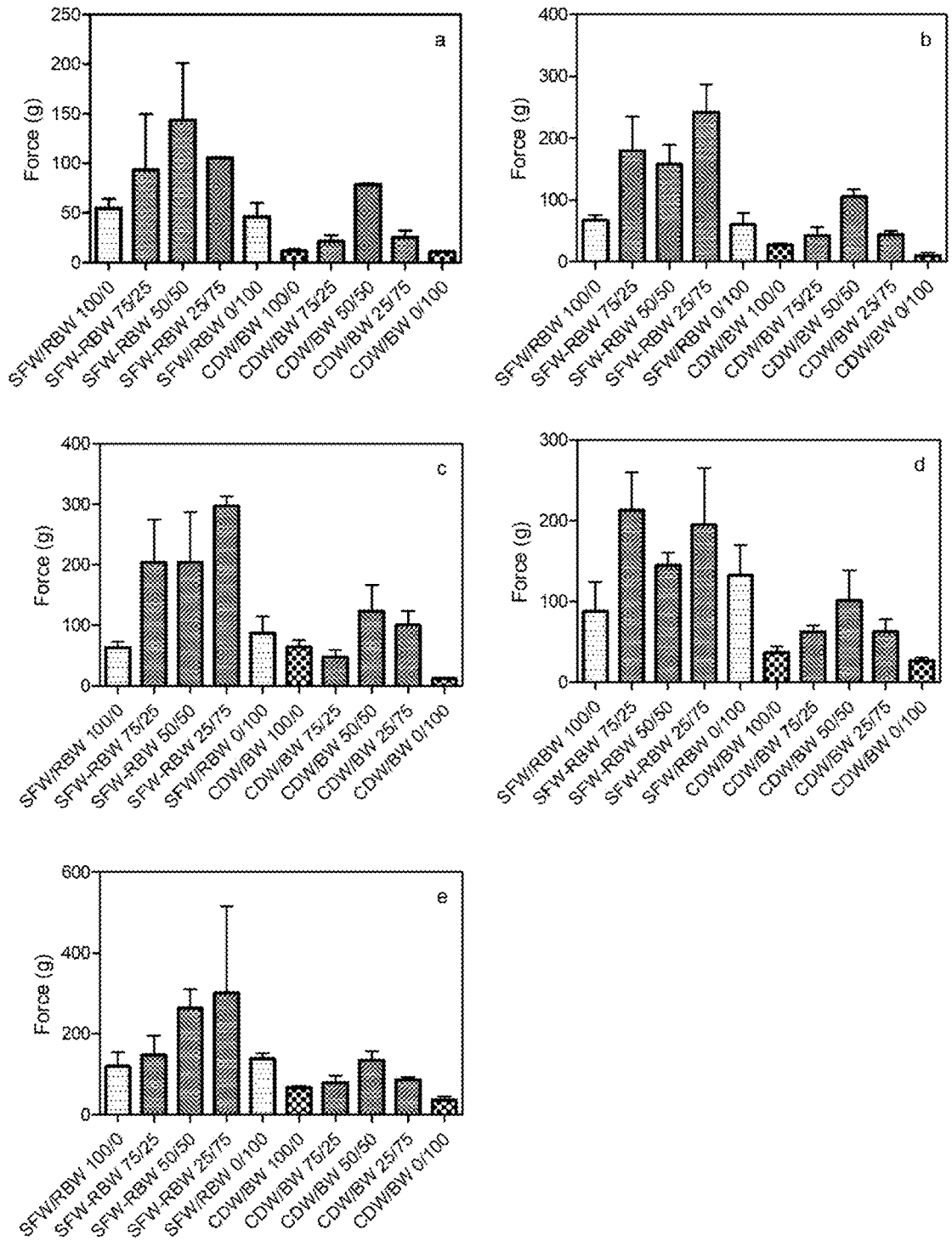
FIG. 4 compares the elastic constant of 2% (a), 2.5% (b), 3% (c), 3.5% (d) and 4% (e) of individual and binary mixtures of sunflower wax (SFW), rice bran wax (RBW), beeswax (BW) and candelilla wax (CDW) in olive oil.

Thus, binary mixing of waxes led to increased hardness of gels (Table 3). Elastic force constant was determined based on the hardness results (Force constant=peak hardness/peak deformation [gram-force/mm]). A synergistic effect on gel hardness and force constant was found for binary mixtures of waxes (Tables 3/4; FIGS. 3 and 4). For example, the hardness of CDW/BW at all concentrations in olive oil was significantly higher (p<0.05) than the hardness of neat candelilla wax and beeswax (Table 3 and FIG. 3). Hardness The force constant for the present oleogels (with binary wax mixture) was desirably in the range of about 20 to 300 g-force/mm, depending on the binary wax mixture, and preferably at least about 50 g-force/mm, or at least about 100-150 g-force/mm (under the conditions used herein). The force constant of a commercially available margarine was about 14+/−6 g-force/mm (for soft margarine at 8° C.) and about 47+/−10 g-force/mm for hard margarine at room temperature.

TABLE 4

The force constant (gel strength) of 2-4% (w/w) individual and binary mixtures of sunflower wax, rice bran wax, candelilla wax and beeswax in olive oil (grams-force/mm) *

| Binary blends | 2.0% | 2.5% | 3.0% | 3.5% | 4.0% |
|---|---|---|---|---|---|
| SFW/RBW 100/0 | 54.9 ± 9.4$^a$ | 67.2 ± 9.1$^a$ | 63.4 ± 9.7$^a$ | 87.8 ± 36.4$^a$ | 120.1 ± 34.1$^a$ |
| SFW-RBW 75-25 | 93.6 ± 56.1$^{a,b}$ | 179.8 ± 55.2$^{b,c}$ | 203.8 ± 70.8$^b$ | 213.4 ± 46.7$^b$ | 147 ± 48.4$^a$ |
| SFW-RBW 50-50 | 143.7 ± 57.9$^b$ | 158.3 ± 30.4$^b$ | 204.2 ± 82.7$^b$ | 144.6 ± 15.9$^{a,b}$ | 263.8 ± 46.4$^a$ |
| SFW-RBW 25-75 | 105.2 ± 1.4$^{a,b}$ | 241.7 ± 45.8$^c$ | 297.1 ± 16.1$^b$ | 195.3 ± 70.0$^b$ | 302.1 ± 213.5$^a$ |
| SFW/RBW 0/100 | 45.9 ± 14.4$^a$ | 60 ± 19.6$^a$ | 87 ± 27.1$^a$ | 132.3 ± 37.3$^{a,b}$ | 138.4 ± 14.2$^a$ |
| CDW/BW 100/0 | 11.4 ± 2.4$^a$ | 26.8 ± 3.1$^a$ | 65.2 ± 10.5$^a$ | 36.9 ± 7.6$^a$ | 67.3 ± 5.0$^a$ |
| CDW/BW 75/25 | 21.5 ± 6.3$^b$ | 42.4 ± 13.8$^{a,c}$ | 48.3 ± 11.3$^{a,c}$ | 62.4 ± 7.8$^{a,b}$ | 79.3 ± 16.8$^a$ |
| CDW/BW 50/50 | 78.4 ± 2$^c$ | 104.9 ± 12$^b$ | 123.7 ± 43.4$^b$ | 101.2 ± 37.6$^b$ | 133.6 ± 24.1$^b$ |
| CDW/BW 25/75 | 25.8 ± 6.5$^b$ | 43.9 ± 6.2$^a$ | 101 ± 23$^{a,b}$ | 62.9 ± 14.9$^{a,b}$ | 86.2 ± 7.1$^a$ |
| CDW/BW 0/100 | 10.7 ± 0.7$^a$ | 9.7 ± 4.7$^{a,d}$ | 12.6 ± 1.3$^c$ | 26.8 ± 3.9$^a$ | 36.1 ± 9.2$^{a,c}$ |
| CDW/RBW 25/75 | 71.6 ± 32.6$^a$ | 68.0 ± 14.8$^a$ | 88.2 ± 28.6$^a$ | 186.1 ± 55.7$^a$ | 218.2 ± 178.8$^a$ |
| BW/RBW 25/75 | 103.9 ± 38.6$^a$ | 109.4 ± 70.0$^b$ | 115.2 ± 22.8$^a$ | 143.0 ± 94.6$^a$ | 182.3 ± 46.3$^a$ |

* Different superscript letters in the same column represent statistically differences between the elastic constant of binary wax mixtures at the same concentration ($P < 0.05$).

Figure 5:
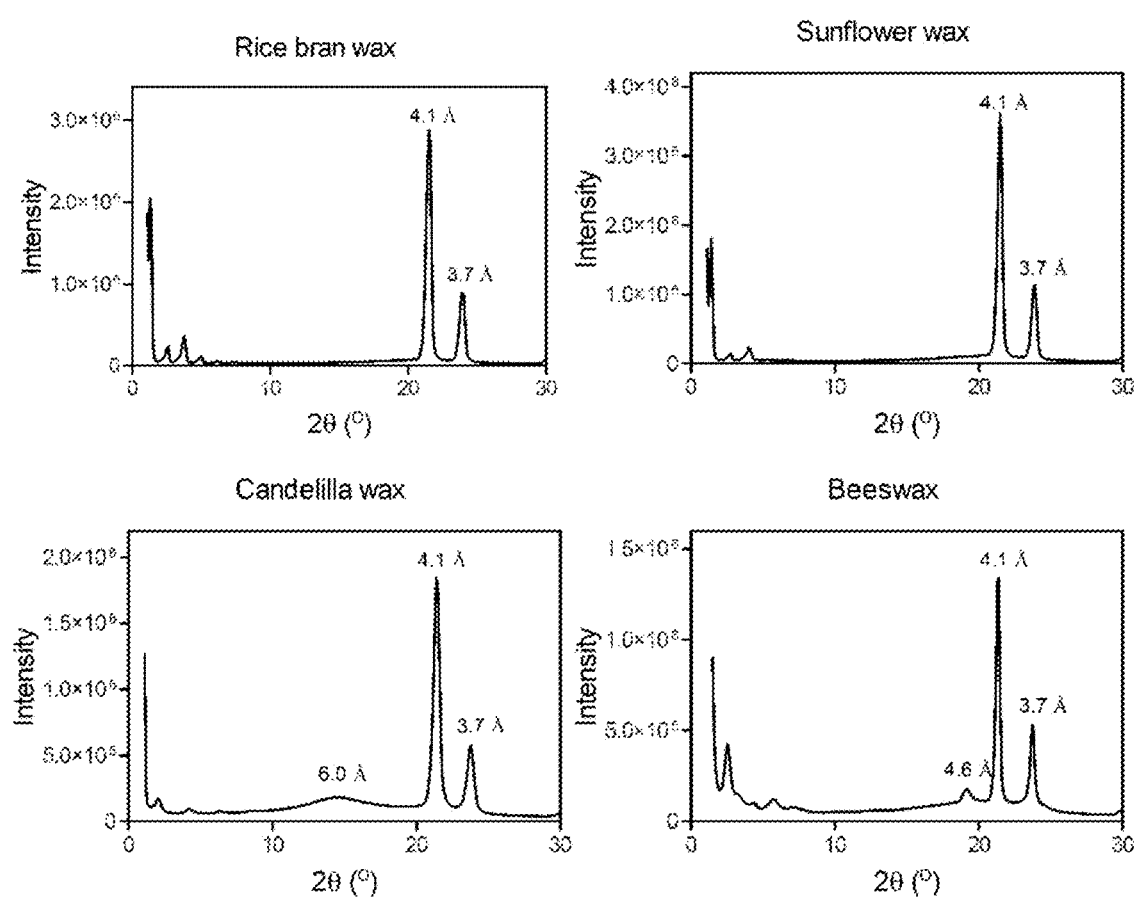
FIG. 5 illustrates small and wide-angle powder X-ray diffraction spectra of pure rice bran wax, sunflower wax, candelilla wax and beeswax.
Figure 6:
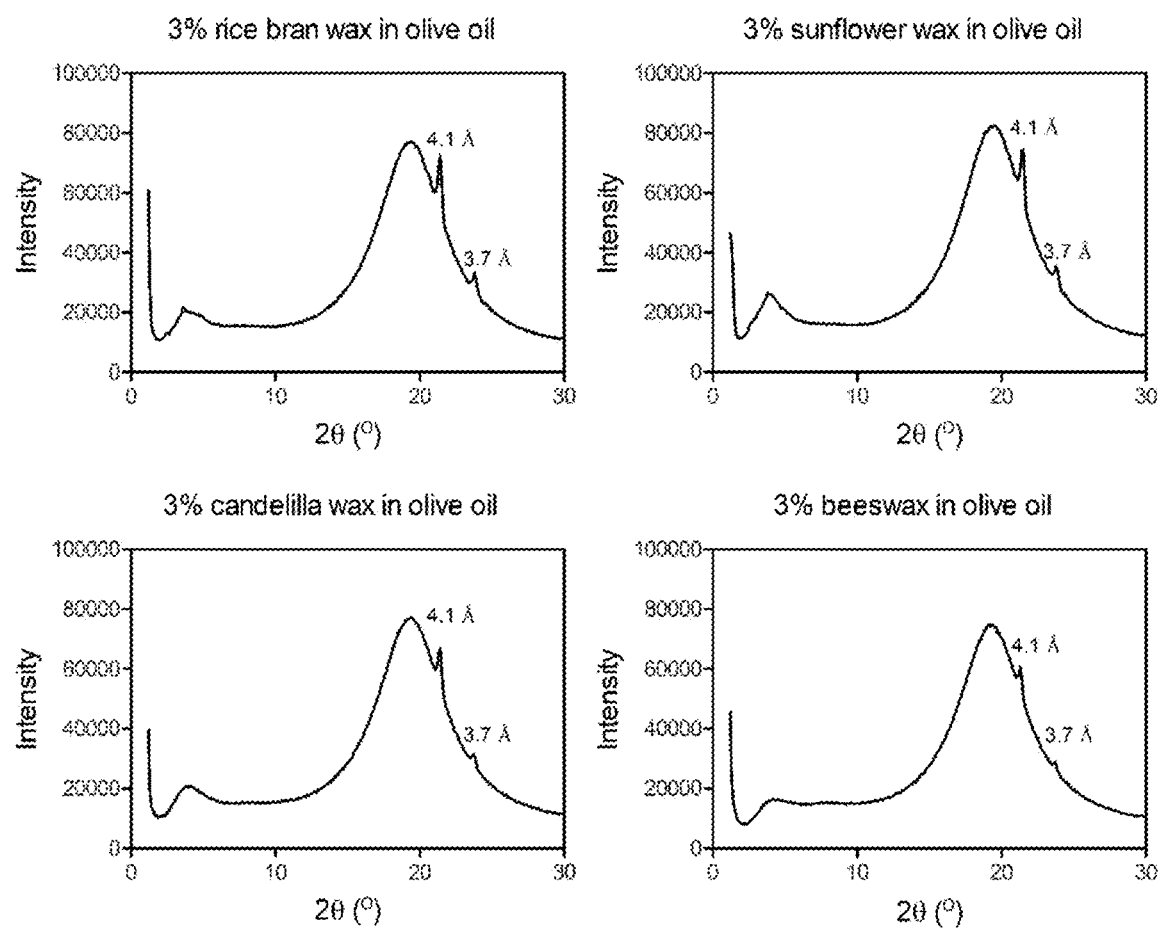
FIG. 6 illustrates small and wide-angle powder X-ray diffraction spectra of 3% (w/w) rice bran wax, sunflower wax, candelilla wax and beeswax in olive oil.
Figure 7:
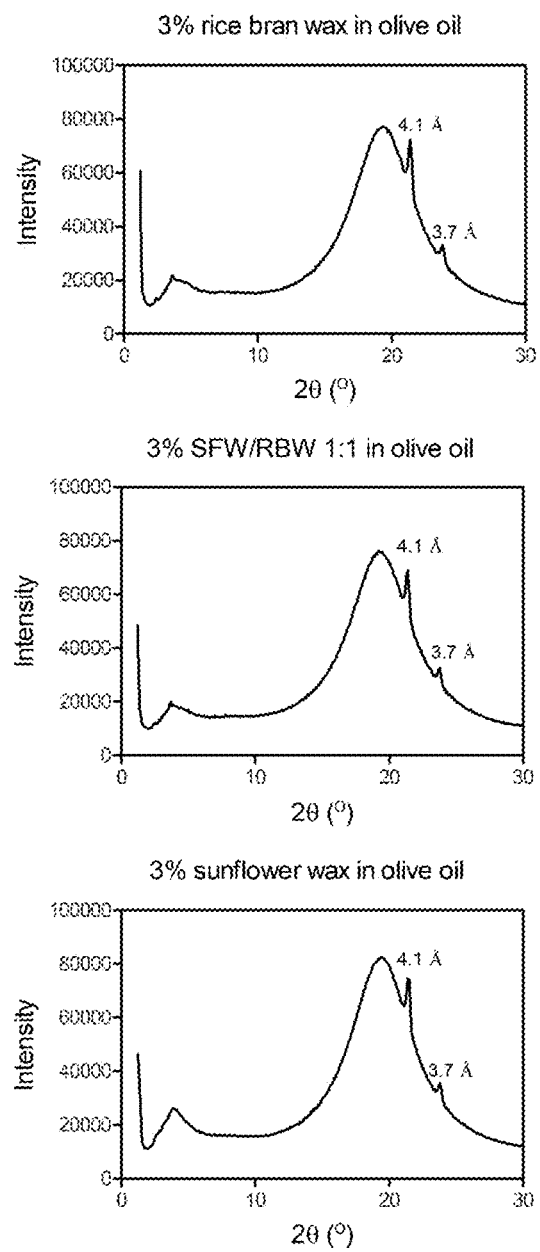
FIG. 7 illustrates small and wide-angle powder X-ray diffraction spectra of 3% (w/w) rice bran wax, sunflower wax and their blend (1-1) in olive oil.

X-ray analysis—Small and wide-angle powder X-ray diffraction spectra of neat rice bran wax, sunflower wax, candelilla wax and beeswax and 3% (w/w) solutions in olive oil are shown in FIGS. 6 and 7, respectively. In previous X-ray analysis of wax structures, two diffraction peaks at 4.1 Å and 3.7 Å in the wide-angle region are generally present. The identical wide angle X-ray diffraction pattern was obtained for all waxes used in this study (FIG. 5). Similarly, comparable results were obtained for 3% wax oleogels in olive oil (FIG. 6). The presence of two diffraction peaks at 4.1 Å and 3.7 Å correspond to orthorhombic perpendicular subcell packing arrangements. This crystal structure is similar to the crystal structures of fats in β' crystal polymorphic form. Since, the size of fat crystals in β' polymorphic form is small, margarines and shortenings in β' crystal form show smooth texture with high spreadability. The "long spacing", SAXS reflection corresponding to the (001) plane, of beeswax, candelilla wax, rice bran wax and sunflower wax in the β' crystal form was reported at 69.95±0.21 Å, 42.14±0.23 Å, 69.32±1.55 Å, 65.35±0.70 Å, respectively. Based on the X-ray diffraction peaks in the SAXS region, candelilla wax showed the smallest crystal size resembling 2 L crystal structure of crystallized triacylglycerols, while the other three waxes were in 3 L crystal forms. However, these results correlate with the molecular composition of each wax. Thus, no dramatic difference between small and wide-angle powder X-ray diffraction spectra of 3% (w/w) rice bran wax, sunflower wax and their blend (1-1) in olive oil was observed (FIG. 7).

Figure 8:
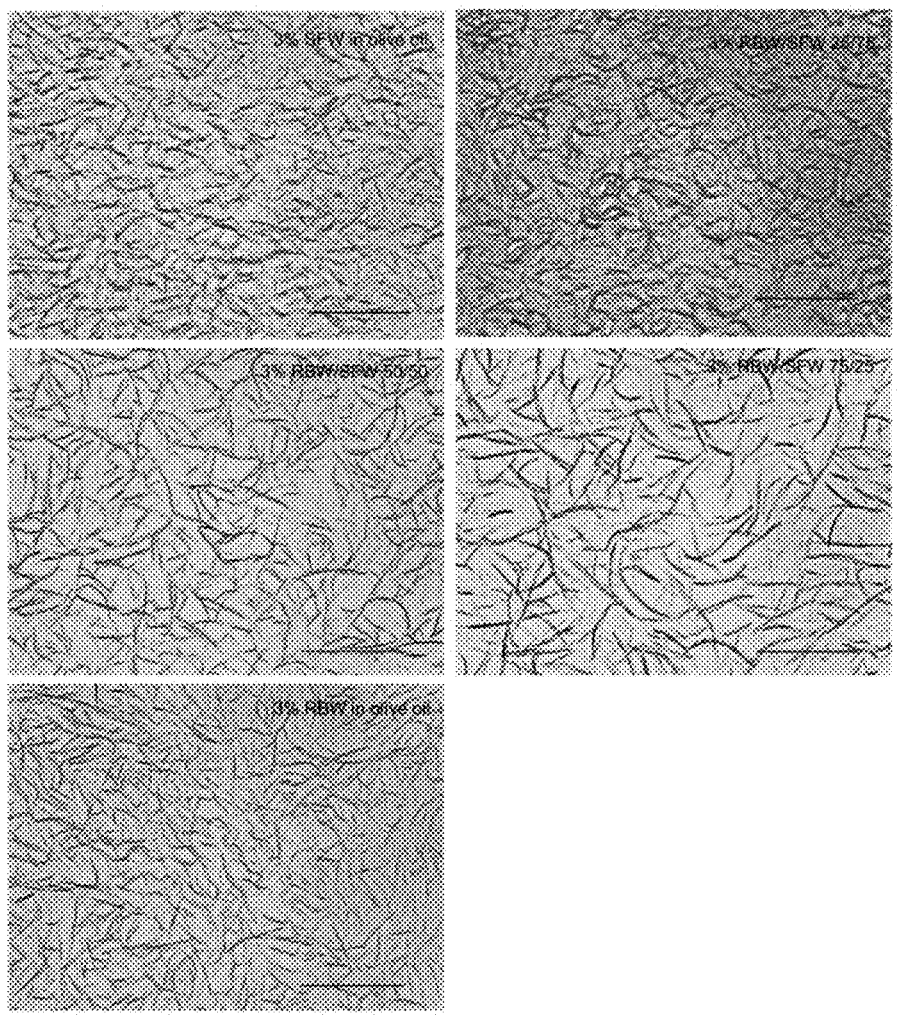
FIG. 8 provides light micrographs of 3% (w/w) sunflower wax (up left), rice bran wax (low left) and blends thereof (25/75%, 50/50% and 75/25%) in olive oil (scale bar=100 μm)

Crystal morphology—Polarized light microscopy (PLM) is a tool used to study crystal structure of wax oleogels. The morphology of the wax oleogel crystal network depends on the chemical composition of waxes (e.g. including wax esters, fatty alcohols, free fatty acids and hydrocarbons) and may be described as comprising needle-like or spherical structures dispersed in liquid oil using polarized light microscopy. Rice bran wax and sunflower wax showed needle-shaped and fibrous morphological structures, leading to desirable gelation properties (lower critical concentration and oiling-off with higher gelation surface). Light micrographs of 3% (w/w) sunflower wax, rice bran wax and their blends (25/75%, 50/50% and 75/25%) in olive oil are shown in FIG. 8. Binary mixtures of sunflower and rice bran waxes exhibited an increase in the size of needle-like structures in wax oleogels which may explain their increased gelation force and zero oiling-off properties.

Thermal behaviour—DSC thermal analysis of pure sunflower wax and rice bran wax, and beeswax and candelilla wax, including individual and binary mixtures (0/100, 25/75, 50/50, 75/25 and 100/0) at different concentrations (2-4%) blended in RBD olive oil are shown in Table 5.

TABLE 5

| Pure wax | Melting point (° C.) | Pure wax | Melting point (° C.) |
|---|---|---|---|
| Candelilla wax | 68.07 ± 0.23 | Sunflower wax | 77.83 ± 0.30 |
| Rice bran wax | 84.12 ± 0.23 | Beeswax | 64.90 ± 0.25 |
| Wax blend (2.5% w/w) in olive oil | | | |
| RBW/SFW 100/0 | 65.48 ± 0.35 | BW/CDW 100/0 | 46.37 ± 0.52 |
| RBW/SFW 75/25 | 64.05 ± 0.09 | BW/CDW 75/25 | 46.28 ± 0.12 |
| RBW/SFW 50/50 | 63.31 ± 0.34 | BW/CDW 50/50 | 44 64 ± 0.78 |
| RBW/SFW 25/75 | 61.57 ± 1.01 | BW/CDW 25/75 | 42.28 ± 0.23 |
| RBW/SFW 0/100 | 59.79 ± 0.57 | BW/CDW 0/100 | 43.89 ± 0.14 |
| Wax blend (3% w/w) in olive oil | | | |
| RBW/SFW 100/0 | 66.19 ± 0.38 | BW/CDW 100/0 | 48.66 ± 0.26 |
| RBW/SFW 75/25 | 64.92 ± 0.37 | BW/CDW 75/25 | 47.73 ± 0.56 |
| RBW/SFW 50/50 | 63.42 ± 0.17 | BW/CDW 50/50 | 45.58 ± 0.53 |
| RBW/SFW 25/75 | 62.41 ± 0.42 | BW/CDW 25/75 | 43.86 ± 0.81 |
| RBW/SFW 0/100 | 60.73 ± 0.52 | BW/CDW 0/100 | 43.20 ± 1.00 |
| Wax blend (3.5% w/w) in olive oil | | | |
| RBW/SFW 100/0 | 67.23 ± 0.96 | BW/CDW 100/0 | 48.80 ± 0.32 |
| RBW/SFW 75/25 | 65.53 ± 0.35 | BW/CDW 75/25 | 46.71 ± 0.08 |
| RBW/SFW 50/50 | 64.44 ± 0.13 | BW/CDW 50/50 | 45.99 ± 0.45 |
| RBW/SFW 25/75 | 63.38 ± 0.30 | BW/CDW 25/75 | 44.96 ± 0.45 |
| RBW/SFW 0/100 | 61.20 ± 0.06 | BW/CDW 0/100 | 45.76 ± 0.44 |
| Wax blend (4% w/w) in olive oil | | | |
| RBW/SFW 100/0 | 67.35 ± 0.56 | BW/CDW 100/0 | 49.29 ± 0.62 |
| RBW/SFW 75/25 | 66.36 ± 0.01 | BW/CDW 75/25 | 48.90 ± 0.01 |
| RBW/SFW 50/50 | 65.19 ± 0.00 | BW/CDW 50/50 | 46.24 ± 0.05 |
| RBW/SFW 25/75 | 63.42 ± 0.24 | BW/CDW 25/75 | 45.01 ± 0.14 |
| RBW/SFW 0/100 | 61.62 ± 0.40 | BW/CDW 0/100 | 44.07 ± 0.37 |
| Wax blend (2.5% w/w) in olive oil | | Wax blend (3% w/w) in olive oil | |
| CDW/RBW 25/75 | 63.49 ± 0.04 | CDW/RBW 25/75 | 64.94 ± 0.98 |
| BW/RBW 25/75 | 62.94 ± 0.08 | BW/RBW 25/75 | 65.13 ± 0.45 |
| Wax blend (3.5% w/w) in olive oil | | Wax blend (4% w/w) in olive oil | |
| CDW/RBW 25/75 | 64.87 ± 0.10 | CDW/RBW 25/75 | 65.91 ± 0.13 |
| BW/RBW 25/75 | 65.36 ± 0.25 | BW/RBW 25/75 | 64.69 ± 0.08 |

Figure 9:
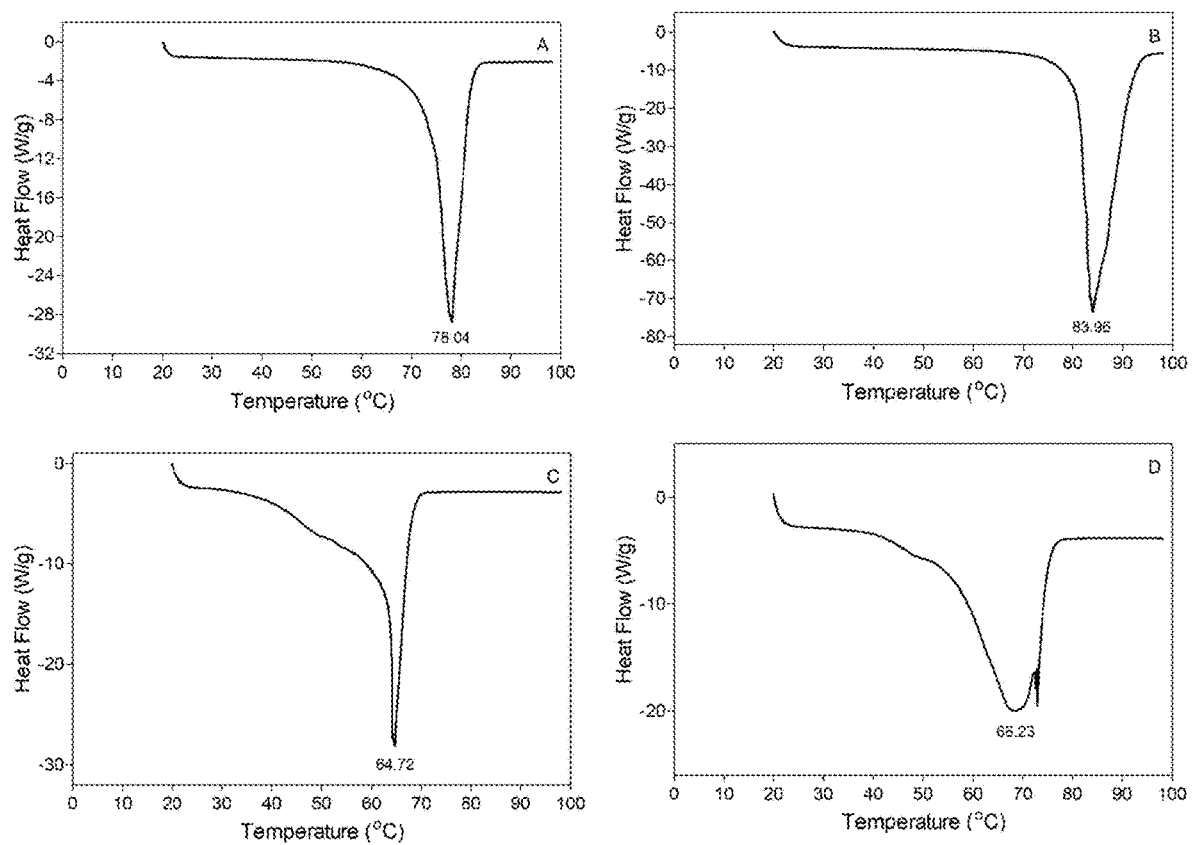
FIG. 9 is a DSC melting profile of pure sunflower wax (A), rice bran wax (B), beeswax (C), and candelilla wax (D)

The highest melting point was observed for rice bran wax (84.12±0.23° C.), followed by sunflower wax (77.83±0.30° C.), candelilla wax (68.07±0.23° C.) and beeswax (64.90±0.25° C.). As shown in FIG. 9, one sharp melting peak was detected for all waxes except candelilla wax which instead showed a wide thermograph DSC curve with multiple-peak profile. The presence of chemically diverse components (free fatty acids, free fatty alcohols and hydrocarbons) in candelilla wax compared to other waxes that contain more homogeneous composition (mainly esters), provides a wide DSC melting profile for this wax. Dissolving waxes in olive oil caused a dramatic reduction in melting points of individual waxes and their binary mixtures (Table 5). For instance, the melting point of pure rice bran wax was 84.12±0.23° C., while after dilution in olive oil, at 2.5%, 3%, 3.5% and 4% wax levels, the melting point dropped to 65.48±0.35° C., 66.19±0.38° C., 67.23±0.96° C. and 67.35±0.56° C., respectively.

Figure 10:
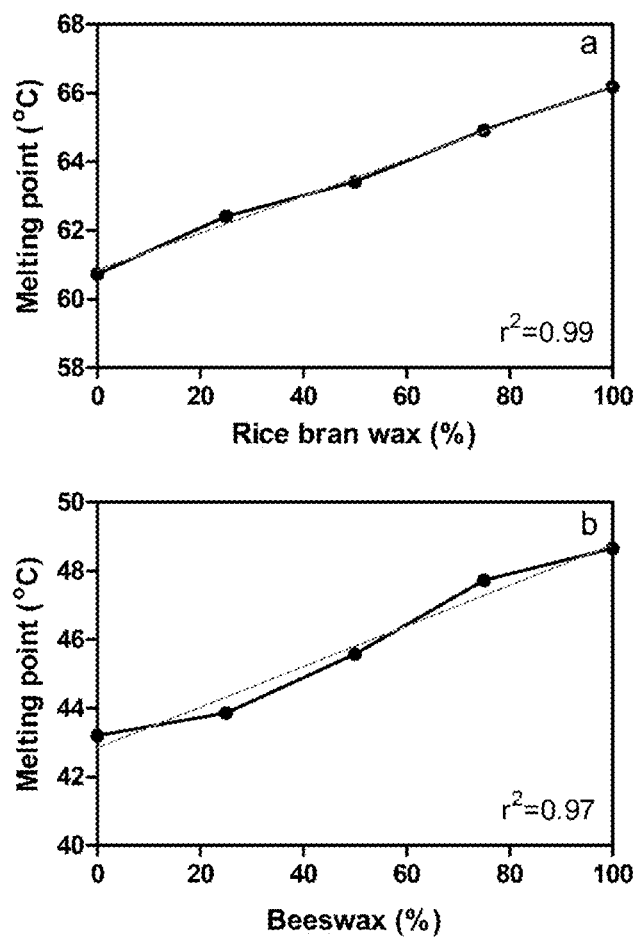
FIG. 10 is a binary phase diagram for binary blends of 3% rice bran wax/sunflower wax (a) and 3% beeswax/candelilla wax (b) in olive oil.
Figure 11:
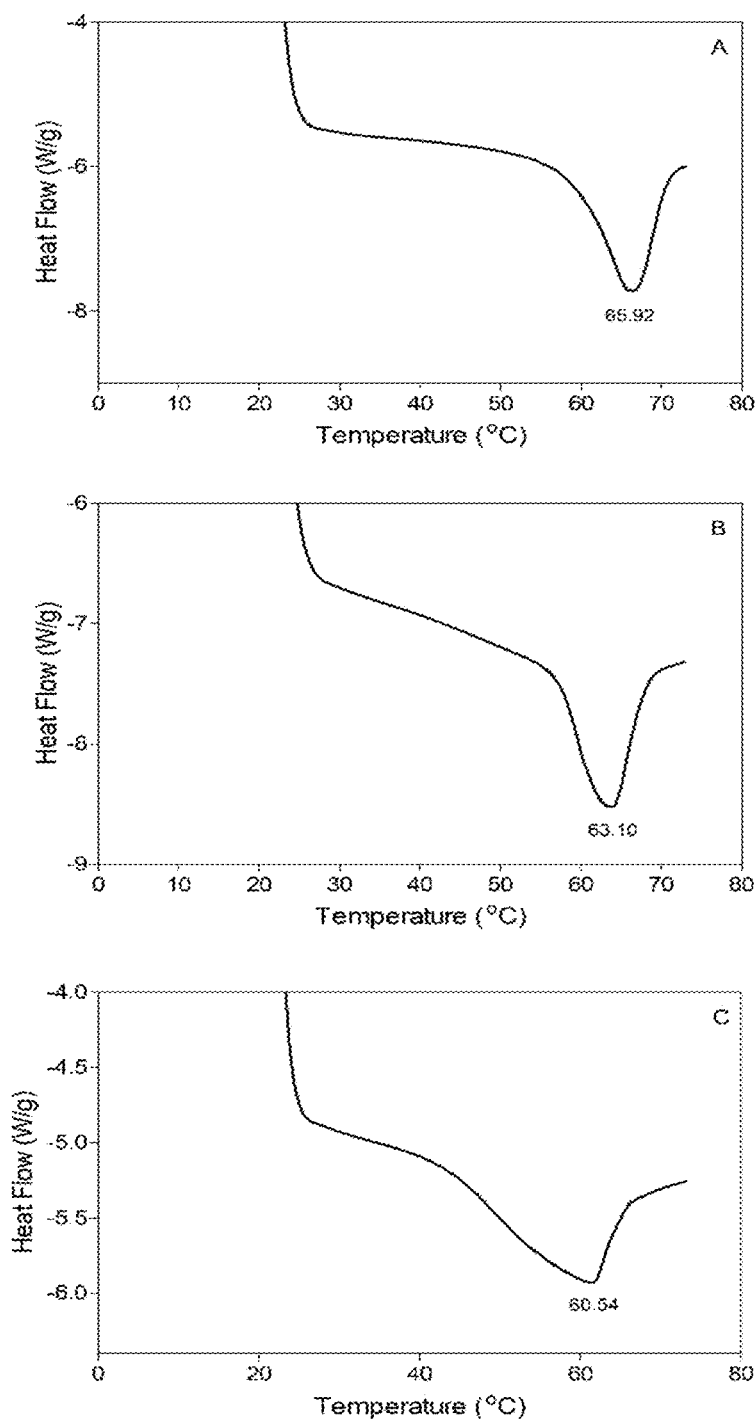
FIG. 11 is a DSC thermogram of 3% rice bran wax (A), sunflower wax (C) and a blend thereof (1-1) in olive oil (B).

The melting points of 3% (w/w) binary mixtures of rice bran wax/sunflower wax (a) and beeswax/candelilla wax (b) at different proportions in olive oil are shown in FIG. 10. This pseudo phase diagram suggests a high solid-state compatibility between sunflower wax/rice bran wax and beeswax/candelilla wax blends in olive oil, indicative of mixed crystal formation in a continuous solid solution. The melting behaviour of other selected binary mixtures of rice bran wax either with candelilla wax or beeswax (CDW/RBW 1:3, BW/RBW 1:3) in oil olive at different ratios (3%, 3.5% and 4% w/w) was also studied. Complete miscibility was observed for these binary wax mixtures in olive oil at mentioned proportions. Three melting points were obtained for the commercial soft margarine at 42.2° C., 44.5° C. and 45.9° C.

CONCLUSION

In this study, oleogels containing binary mixtures of sunflower wax, rice bran wax, candelilla wax and bees wax showed novel physical and functional characteristics compared to individual wax oleogels. Improved plasticity, firmness, zero oiling-off, β' crystal structure form and improved 3D crystal network through increases in the size of wax crystals was observed for binary mixture of sunflower wax/rice bran wax and beeswax/candelilla wax. Such mixtures, thus, are suitable alternatives for baking shortenings and table margarines.

Example 2—Use of Oleogel to Make Pizza Dough

Peinirli, a pizza- or ciabatta-type dough, was made using an oleogel in accordance with an aspect of the present invention comprising 97% refined olive oil and 3% (50:50 RBX:SFX).

The peinirli was made as follows. The dry ingredients (1500 g wheat flour (e.g. 50% hard unbleached bread flour), salt (30 g) & sugar (30 g)) were combined and mixed (without the addition of water) for 2 minutes (1 minute at slow speed, 1 minute at high speed) in a mixer. About 50% of the water (450 g) was added to the mixed dry ingredients and mixed at low speed. As soon as the dough started to form, the rest of the water (450 g) and the yeast (30 g) was added, and the dough was mixed at low speed. When the dough was formed, the oleogel (150 g) was added with continued mixing at low speed for a total kneading time of approximately 15 minutes. Following mixing, the dough was formed into a ball, covered to prevent loss of moisture and rested for 12 hours at +40° C. Without any additional kneading of the dough, dough pieces of the desired weight were cut from the dough ball and formed into the desired product shape (e.g. the traditional boat shape). The dough pieces were proofed at 360° C., 82% RH, for about 1 hour, and then partially baked at 2000° C. for 6-8 minutes (depending on the product pieces weight) in a circulating air oven. Once cooled, the peinirli may be filled with selected cheese(s) and/or meats (e.g. ham, bacon, or cold cuts) for an additional 10 minutes at 2000° C.

The resulting pizza dough was comparable to pizza dough made with butter/shortening.

Example 3—Use of Oleogel to Make Bread Snack

A dough for making koulouri, a bread snack (e.g. for breakfast and/or lunch, either plain, or topped with a topping such as sesame seeds, nuts or cereal flakes before baking, or filled with cheeses, tomatoes, meat cold cuts, etc. after baking), was prepared as follows with the oleogel of Example 2.

The dry ingredients (1500 g wheat flour (e.g. 1200 g hard unbleached bread flour and 300 g soft unbleached pastry flour, salt (30 g) & sugar (170 g)) were combined and mixed (without the addition of water) for 2 minutes (1 minute at slow speed, 1 minute at high speed) in a mixer. About 50% of the water (375 g) was added to the mixed dry ingredients and mixed at low speed. As soon as the dough started to form, the rest of the water (375 g) and the yeast (15 g) were added, and the dough was mixed at low speed. When the dough was formed, the oleogel (150 g) was added with continued mixing at low speed until the oleogel was incorporated into the dough, and then the dough was mixed at high speed, for a total kneading time of approximately 12 minutes. Without any resting of the dough, dough pieces of the desired weight were cut from the dough ball and formed into the desired product shape. The dough pieces were sprinkled with sesame seeds, corn flakes or nuts, proofed at 360° C., 82% RH, for about 1 hour, and then baked at 2000° C. for 9-11 minutes (depending on the product pieces weight) in a circulating air oven. At the initial stage of baking, steam was required (steam quantity was equivalent to 6 l of water for an interior oven size of 1.8×0.8×0.8 m).

The resulting product was comparable to koulouri made with butter/shortening.

Example 4—Use of Oleogel to Make Raisin Bread

The dry ingredients (1500 g wheat flour (e.g. 50% hard unbleached bread flour, salt (30 g), sugar (170 g) and cinnamon (6 g)) were combined and mixed (without the addition of water) for 2 minutes (1 minute at slow speed, 1 minute at high speed) in a mixer. About 50% of the water and milk (200 g of each) and 3 eggs were added to the mixed dry ingredients and mixed at low speed. As soon as the dough started to form, the rest of the water and milk (200 g of each) and the yeast (30 g) were added, and the dough was mixed at low speed. When the dough was formed, the oleogel (150 g) was added with continued mixing at low speed until the oleogel was incorporated into the dough, and then the dough was mixed at high speed, for a total kneading time of approximately 12 minutes. Raisins (300 g) were added in the last minute of mixing. The raisins may be substituted partially with dried cranberries, or other dried berries or fruit pieces/rind, if desired). Without any resting of the dough, dough pieces of the desired weight were cut from the dough ball and formed into the desired product shape. The dough pieces may be sprinkled with sesame seeds, corn flakes or nuts, proofed at 360° C., 82% RH, for about 1 hour, and then baked at 2000° C. for 9-11 minutes (depending on the product pieces weight) in a circulating air oven.

The raisin bread was comparable to raisin bread made with butter/shortening.

Example 4—Use of Oleogel to Make Cookies

The present oleogel was used to make cinnamon sweet cookies as follows.

All of the ingredients (except flour) were mixed at high speed for about 4 minutes in a mixing bowl (oleogel 400 g, orange juice 240 g, orange zest (to taste), sugar 400 g, brandy or cognac 150 ml, baking powder 2 teaspoons, baking soda 1 tsp and cinnamon 1 tsp). The flour was then added (1200 g of 100% soft unbleached pastry flour) and the dough was mixed at low speed for about 2 minutes. At this point, a variety of dehydrated fruits (raisins, cranberries, etc.) or chocolate chips can be added, up to 20% of the total dough weight. Mixing was continued at slow speed to incorporate the fruits/chips into the dough. The dough was cut into pieces of the desired weight and formed into the desired product shape. The top of the cookies was sprinkled with sesame seeds (or may be sprinkled with other topping such as sugar, cinnamon, nuts, etc.). The cookies were baked at 1700° C. for 18-22 minutes (depending on the product pieces weight) in a circulating air oven until desired doneness.

The cookies were comparable to cookies made with butter or shortening.

Example 5—Use of Oleogel to Make Sweet Tarts

Sweet tart (to be filled or topped with a variety of fillings or toppings, before or after baking, respectively).

All of the ingredients (except the flour and the fresh yeast) were mixed well in a mixing bowl at high speed for about 4 minutes. Ingredients and amounts are shown below. The yeast (8 g—suitable for high sugar concentrations) and then flour (1000 g of 50% soft unbleached pastry flour) were then added to the bowl and mixed at low speed for about 2 minutes. The dough was shaped, filled with fruit filling and baked at 1700° C. for 18-22 minutes (depending on the product pieces weight) in a circulating air oven until desired doneness.

| Ingredients | |
|---|---|
| Salt | 20 g |
| Sugar | 130 g |
| Oleogel | 400 g |
| Yogurt (plain) | 100 g |
| Eggs | 2 eggs |
| Milk (whole) | 200 g |
| Water | 180 g |
| Baking powder | 10 g |

| Ingredients | |
|---|---|
| Fresh Baker's yeast | 8 g (suitable for high sugar concentrations) |
| Wheat flour | 1000 g |

The tart was comparable to tarts made with shortening.

Example 6

One or more of the above recipes were repeated using an oleogel comprising 96% refined olive oil and 4% (50:50 RBX:SFX), and an oleogel comprising 97.5% refined olive oil and 2.5% (50:50 RBX:SFX). These oleogels performed similar to the oleogel of Example 2 to yield baked goods comparable to those made with a commercially available shortening product.

The invention claimed is:

1. An oleogel comprising olive oil having an oleic acid content of at least about 50% in an amount of at least 95 wt % combined with a binary wax blend of 2-4 wt %, wherein the oleogel exhibits less than 10% oiling off and a back extrusion hardness of greater than 100 g-force.

2. The oleogel of claim 1, wherein the binary wax blend comprises at least two of the following waxes: rice bran wax, carnauba wax, candelilla wax, sunflower wax, jojoba oil wax, corn oil wax, sugarcane wax, ouricury wax, beeswax, retamo wax, and wax which results from a fully hydrogenated oil.

3. The oleogel of claim 2, wherein at least one of the waxes of the binary wax blend is sunflower wax or rice bran wax.

4. The oleogel of claim 2, wherein the binary wax blend comprises sunflower wax and rice bran wax.

5. The oleogel of claim 1, wherein the binary wax blend comprises a 1:1, 1:2 or 1:3 ratio of the selected waxes.

6. The oleogel of claim 1, comprising 97% by wt olive oil and 3% by wt binary wax blend of rice bran wax and sunflower wax.

7. The oleogel of claim 1, wherein the binary wax blend comprises candelilla wax and beeswax.

* * * * *